United States Patent [19]

Carpentier et al.

[11] Patent Number: 4,886,254
[45] Date of Patent: Dec. 12, 1989

[54] ELASTIC SUSPENSION BLADE PROVIDED WITH END CONNECTORS FOR A VEHICLE

[75] Inventors: Jean-Claude Carpentier, Mareil-Le-Guyon; Bernard Michel, Montigny-le-Bretonneux; Kenneth H. Sayers, Neauple-le-Chateau, all of France

[73] Assignee: Bertin & Cie, Cedex, France

[21] Appl. No.: 155,711

[22] PCT Filed: Apr. 22, 1987

[86] PCT No.: PCT/FR87/00133
§ 371 Date: Dec. 23, 1987
§ 102(e) Date: Dec. 23, 1987

[87] PCT Pub. No.: WO87/06665
PCT Pub. Date: Nov. 5, 1987

[30] Foreign Application Priority Data

Apr. 25, 1986 [FR] France ............... 86 06014
May 23, 1986 [FR] France ............... 86 07382

[51] Int. Cl.⁴ ............................................. F16F 1/36
[52] U.S. Cl. ................................. 267/148; 267/260
[58] Field of Search ............... 267/148, 149, 260, 262

[56] References Cited

U.S. PATENT DOCUMENTS 3,219,333 11/1965 Derschmidt et al. ............... 267/149

FOREIGN PATENT DOCUMENTS

| 132713 | 7/1984 | European Pat. Off. . |
| 2573013 | 5/1986 | France . |
| 2516455 | 12/1986 | France . |
| 52146462 | 6/1929 | Japan . |
| 2158548 | 11/1985 | United Kingdom . |
| 86/02887 | 5/1986 | World Int. Prop. O. . |
| 8702109 | 4/1987 | World Int. Prop. O. ......... 267/260 |

Primary Examiner—George E. A. Halvosa
Attorney, Agent, or Firm—A. W. Breiner

[57] ABSTRACT

Elastic suspension leaf (1) made of composite material of which the extremities have a width which decreases concomitantly with a thickness increase, comprising connectors forming a rigid casing and defining an inner trapezohedral volume which fits on the extremities of the leaf. The casing includes a cylindrical ring (9) for connection to a wheel. The connector is comprised of metal elements (10,11,12) or of fiber ribbons embedded in a synthetic resin.

18 Claims, 3 Drawing Sheets

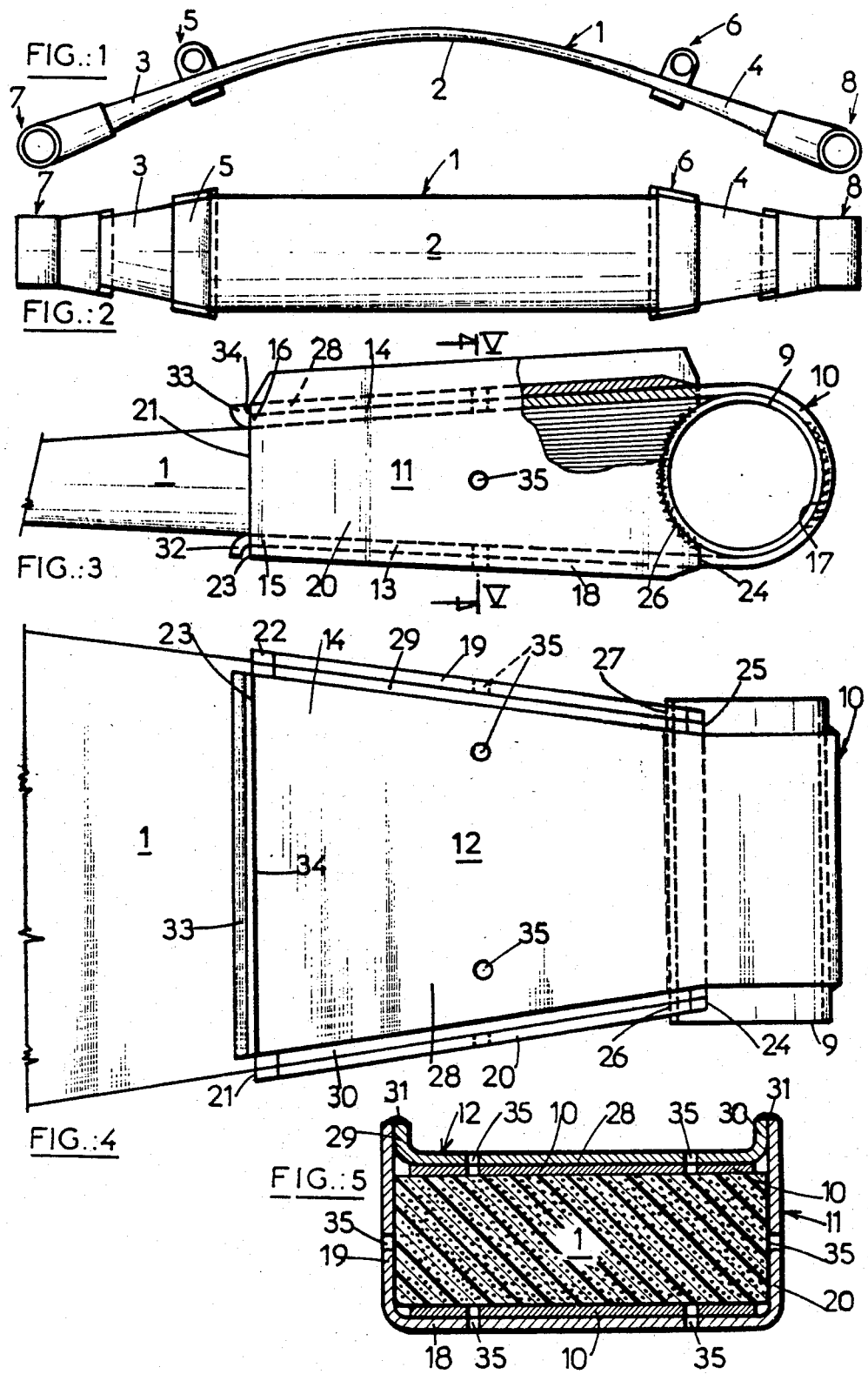

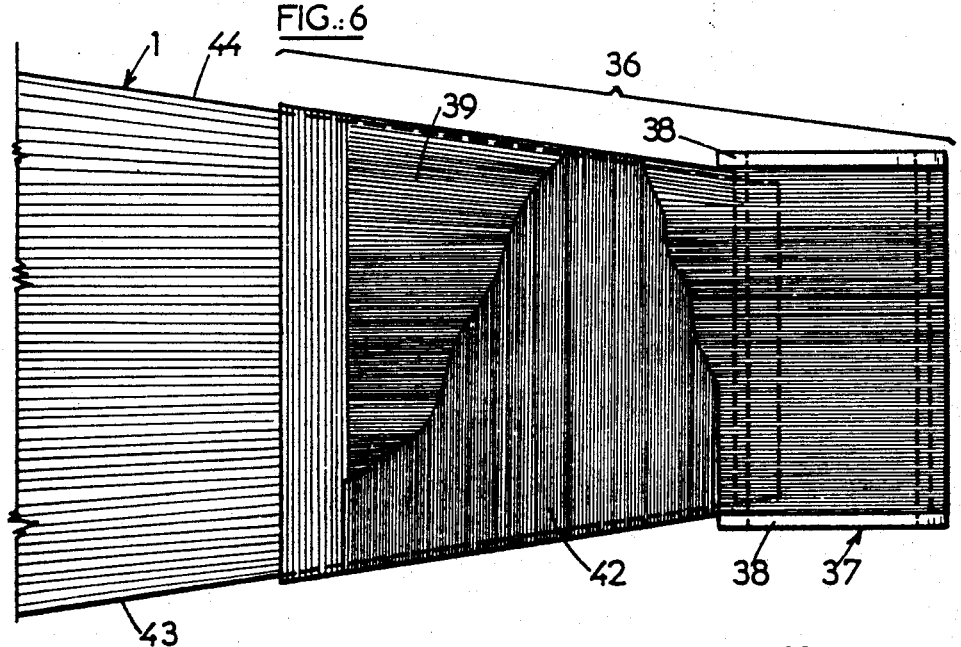
FIG.:6
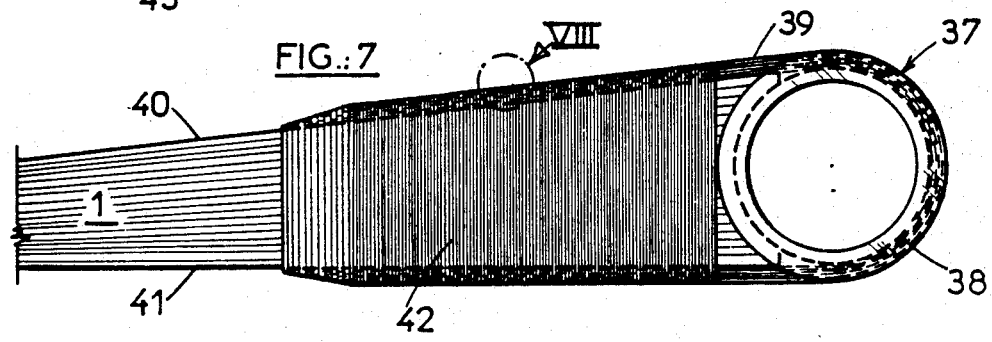
FIG.:7

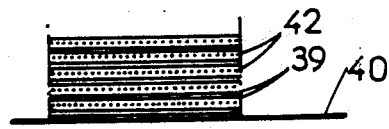
FIG.:8
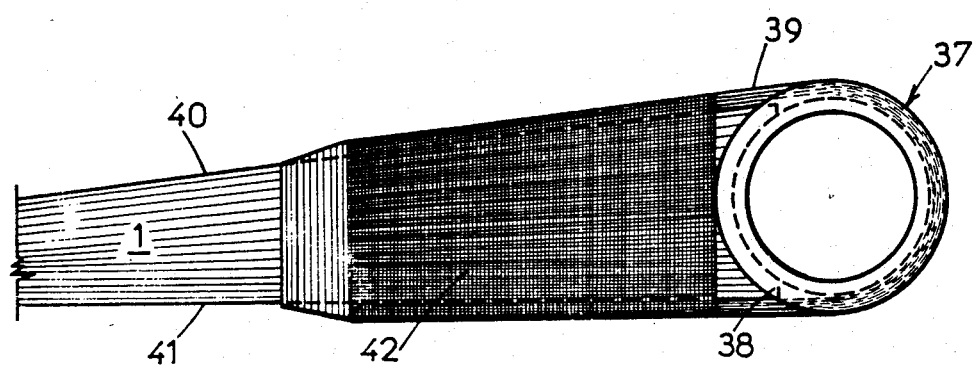
FIG.:9
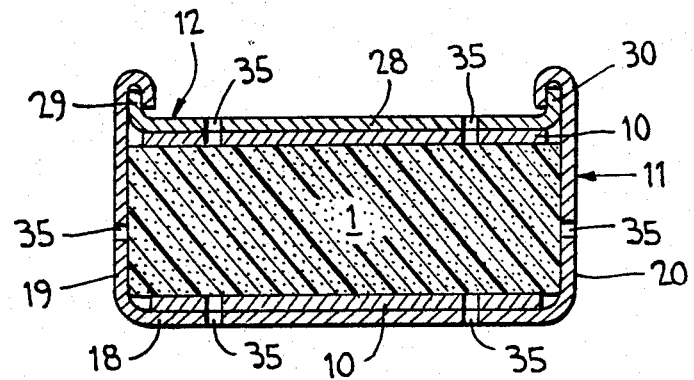
FIG. 10

ELASTIC SUSPENSION BLADE PROVIDED WITH END CONNECTORS FOR A VEHICLE

The invention relates to an elastic vehicle suspension leaf which has, at its ends, terminal pieces equipped with means of connection to the wheels.

The patent FR-A-2,516,455 makes known a vehicle suspension leaf consisting of a composite material with longitudinal fibers extending continuously from one end to the other. At its ends, this leaf has an evolute profile of approximately constant cross-section, the width of which decreases concomitantly with an increase in thickness. The means of connection to the wheel supports comprise a tubular metal insert having a seat, on which the end of the kingpin rests. To fasten this insert, it is necessary to perforate the leaf and consequently cut a certain number of fibers. The dimensions of the leaf therefore have to be increased in order to allow for the weakening caused by the fitting of the insert.

French Pat. No. 2,573,013 overcomes this disadvantage by providing a device intended for connecting the leaf to the wheel support, taking the form of a cage comprising two lateral trapezoidal flanges, of which the projection in a horizontal plane is in the form of a truncated V carrying the seat of the kingpin at its end. The two flanges are connected by means of a bar at the lower edge of their free ends and by means of a rest in the upper part adjacent to the seat. The end of the leaf is introduced between the bar and the rest and engages between the flanges. Adhesive bonding between the cage and the end of the leaf is provided if appropriate. Since the cage is held in a vertical plane by being wedged between the bar and the rest, a vertical force directed from the bottom upwards has to be exerted on the end of the cage in order to keep it in place. When the suspension leaf is installed on the vehicle, the stress to which it is subjected generates an appropriately directed force which keeps the cage or cages in place.

It is difficult to keep the cages in position as long as the leaf is not fastened to the vehicle. Moreover, the cage has to be machined with a high degree of accuracy, so that it can fit as closely as possible on the end of the leaf in order to prevent the lateral and vertical play detrimental to the long-term stability of the suspension.

The series production of composite suspension leaves results in components which have tolerances greater than the thickness of an adhesive joint in relation to the dimensions of the ends. These considerable variations prevent accurate machining of the cages to be fitted on them.

The terminal piece, as described above, is a heavy and esthetically unsatisfactory component. The patent JP-A-52.146,462, for example, provided for producing a lighter terminal piece from a material similar to that of the leaf. The end of the leaf is machined to a concave cylindrical surface, in which a cylindrical ring is partially seated and retained in a framework made of epoxy resin. Such a device cannot be used with leaves intended for withstanding a partial or complete anti-camber effect at their ends, without the risk that the end of the leaf will be torn off or dislocated.

The invention aims to rectify the abovementioned defects by providing an elastic leaf, the terminal pieces of which make it possible to compensate the dimensional variations of the ends of the leaf and to fasten them definitively and independently of the forces to which they are subjected, without the risk that the leaf will be dislocated.

The elastic suspension leaf according to the invention is notable in that it has, at its ends, terminal pieces comprising a rigid housing, the four faces of which define a trapezoidal inner volume, the small bases of two opposite faces being adjacent to the large bases of the other two faces, and the dimensions of the trapezia forming the four faces correspond to the dimensions of the lateral faces of the ends of the leaf, to which the terminal piece is fastened, so that the corresponding evolute part of the leaf engages therein and is blocked longitudinally there as a result of double interlocking, in order to absorb and distribute all the forces originating from the wheel, without the stress being concentrated.

The explanations and Figures given below by way of example will make it possible to understand how the invention can be put into practice.

FIGS. 1 and 2 show respectively a diagrammatic sectional view in a vertical plane and a diagrammatic plan view of a leaf according to the invention.

FIG. 3 is a partially cutaway side view of a first exemplary embodiment of a terminal piece of the leaf according to the invention.

FIG. 4 is a top view of FIG. 3.

FIG. 5 is a sectional view along the line V—V of FIG. 3.

FIG. 6 is a partially cutaway top view of a second exemplary embodiment of a termainl piece of the leaf according to the invention.

FIG. 7 is a partially cutaway side view of the leaf and of its terminal piece according to FIG. 6.

FIG. 8 is a sectional view of a part VIII of FIG. 7 in the plane of the FIG.

FIG. 9 is a partially cutaway side view of a leaf and its terminal piece according to a third exemplary embodiment.

FIG. 10 is a sectional view similar to the view of FIG. 5 but showing a different method of bonding the cover to the housing.

FIGS. 1 and 2 show an elastic suspension leaf 1 in a side view and a plan view. This leaf consists of a composite material formed from mineral or organic fibers extending continuously from one end of the leaf to the other and embedded in a suitable binder, as described in the patent FR-A-2,516,455. This leaf has a parallelepipedic central part 2 joined to two end parts 3, 4 of evolute shape, having in the horizontal plane (FIG. 2) a reduction in width concomitant with an increase in thickness in the vertical plane (FIG. 1), the cross-section remaining approximately constant.

The positions of the devices 5, 6 for connecting the suspension leaf 1 to the chassis and the terminal pieces 7, 8 provided at the ends of the leaf for connecting it to the wheels have been shown diagrammatically. The connecting devices are arranged in an evolute region of the leaf, in order to take advantage of the fact that its faces are not parallel with one another, so as to ensure blocking.

According to the various embodiments shown in FIGS. 3, 6 and 7, the terminal pieces 7, 8 form a rigid housing, the four faces of which define a trapezoidal inner volume. The small bases of two opposite faces are adjacent to the large bases of the other two faces. The dimensions of the trapezia forming the four faces of the housing correspond approximately to the dimensions of the lateral faces of the ends of the leaf to which the terminal piece is fastened. The terminal pieces define, at least on the inside, an evolute shape similar to those of the ends and are blocked in a definitive longitudinal position. This blocking is obtained because of the reversed trapezoidal shapes of the adjacent faces of the leaf and of the matching terminal piece.

FIGS. 3 and 4 illustrate a first exemplary embodiment of a terminal piece according to the invention, which equips one end of a suspension leaf 1. This terminal piece is intended for holding a means of connection to the wheel support consisting, for example, of a cylindrical ring 9 serving as a bearing for an axle mounted on the wheel support.

To provide a bearing notch for improving the fixing between the end of the leaf and the ring 9, the said end is milled to a concave cylindrical surface, the axis of which is in the plane of symmetry of the end perpendicular to the plane of FIG. 3 and in which the ring 9 will be partially seated.

The terminal piece itself is composed of at least three elements, namely a casing 10, a framework 11 and a cover 12.

The casing 10 comprises an element in the form of a U with a round bottom, the lateral branches 13, 14 of which widen towards their free ends 15, 16. The rounded bottom 17 has a diameter corresponding to that of the ring 9 with which it interacts. The lateral branches 13, 14 have the form of an isosceles trapezium with dimensions approximately equal to those of the leaf face parts against which they are laid.

The framework 11 of U-shaped cross-section has a bottom 18 and two lateral sides 19, 20 in the form of an isosceles trapezium, of which the small bases 21, 22 of the lateral sides are adjacent to the large base 23 of the bottom.

The edges 24, 25 forming the large bases of the lateral sides have coaxial circular indentations 26, 27, the radius of which corresponds to the outer radius of the cylindrical ring 9 to which they are welded.

The inner dimensions of the framework are a function of the dimensions of the end of the leaf and allow for the maximum dimensions which it is possible for the series-produced leaves to have. The trapezoidal volume defined between the walls of the housing corresponds to the profile of the end of the leaf.

The heights of the sides of the framework 11, corresponding to the large bases 24, 25 and small bases 21, 22 of the trapezia forming the said sides, are such that there make it possible to accommodate the leaf 1, the two thicknesses of the casing 10 and the cover 12.

The cover 12 is in the form of an isosceles trapezium and is capable of engaging between the lateral sides 19, 20 of the framework 11. According to the embodiment illustrated, the cover has a U-shaped cross-section. The lateral sides 29, 30 carried by the bottom 28 come flush with the edges of the sides 19, 20 of the framework and are fixed over their entire length, for example by means of a weld 31. Where the sides of the framework are higher than the sides of the cover, the cover is fixed to the sides by crimping as shown in FIG. 10.

According to an embodiment not illustrated, the sides of the framework and those of the cover are right-angled trapezia.

The casing 10, at at least one of the ends 15, 16 of its lateral branches 13 or 14, has a preformed rim 32, 33 which buts against the free end 23 or 34 of the framework 11 or of the cover 12. The other branch of the casing is sufficiently long to allow it to be retained and turned down against the end 34 or 23 of the cover or of the framework.

The embodiments described above, in which the framework and cover are fixed together to form a housing at edges distant from the composite leaf, make it possible to select the heights of the sides of the housing and of the cover so as to prevent any risk of damage to the end of the leaf fitted in the housing.

To make it possible to compensate the variations in the dimensions of the leaf and increase its resistance, injection orifices 35 are provided in the various components for the purpose of injecting synthetic resin which will fill the gaps which may exist between the leaf and the housing. The penetration and flow of the resin between the casing 10 and the leaf 1 are made easier if liners (not shown) formed by thin metal wires are inserted.

The terminal piece is fitted on the end of a composite suspension leaf in the following way:

According to the first embodiment, the terminal piece is in the form of two components: the first piece comprising the framework 10, to the end of which is welded the ring 9, round which the casing 11 is fastened, one of its trapezoidal parts 13 being placed in the bottom 18 of the framework against the edge 23, to which the rim 32 is attached, and the second component comprising the cover 12.

The first component is fitted on the end of the leaf, in which the receptacle for the ring 9 has previously been milled. The second trapezoidal part 14 of the casing is turned down onto the leaf. The cover 12 is then placed between the sides 19, 20 of the framework against the casing, in such a way that its sides are in the same direction as those of the housing. The cover and the casing are pressed against the leaf, and the rim 33 of the part 14 of the casing is then attached to the edge 34 of the cover. The adjacent longitudinal edges of the housing and of the cover are joined together by a suitable means (welding, crimping, etc.).

The terminal piece according to the second embodiment comprises three components, a first component formed by the framework 11, to the end of which the ring 9 is welded, a second component consisting of the casing 10, only one of the edges 15 of which carries a rim 32, and a third component consisting of the cover 12.

The part 13 of the casing 10 is placed in the bottom 18 of the framework, the rim 32 being retained by the edge 23 of the framework.

The end of the leaf is introduced into the assembly as a whole. After wedges have been inserted, the free part 14 of the casing is turned down onto the leaf, and the cover is placed between the sides 19, 20 of the housing and on the part 14 of the casing, in such a way that the edges are in the same direction as those of the framework. The cover is retained and fixed to the framework by one of the methods described with regard to the preceding embodiment. The end 16 of the casing projecting beyond the framework and the cover is grasped with a suitable pulling tool and the said end is turned down against the edge of the cover in order to form the rim 33. If appropriate, the casing can be fixed to the ring at certain points, as indicated in FIGS. 3 and 4.

When fitting and welding have been carried out, synthetic resin is injected into the terminal piece via the injection orifices 35 in both cases, if appropriate.

It should be noted that the terminal piece forming a housing is self-blocking, that is to say it is automatically immobilized at least in the longitudinal direction of the leaf as a result of their matching profiles.

FIGS. 6, 7 and 8 illustrate a second embodiment of a leaf with terminal peices according to the invention.

As in the preceding embodiment, the end of the suspension leaf 1 is equipped with a terminal piece 36 intended for holding a means of connection to the wheel support. This connection means is a cylindrical ring 37.

The ring 37 carries two collars 38 at its ends and is partially seated along a generatrix in a cylindrical cavity which is milled in the end of the leaf and the axis of which is in the horizontal plane of symmetry. As before, the ring is retained in its cylindrical receptacle by means of adhesive bonding.

The housing forming the terminal piece is produced in situ from composite material in crossed layers of fiber fleece or fabric. The first layer or first layers 39 are arranged in the longitudinal direction on the upper face 40 and lower face 41 of the leaf and pass over the ring 38 to form a casing. One or more other layers 42 are laid in the transverse direction and, as in the example of FIGS. 3 and 4, form a framework and a cover fixed to one another round the lateral edges 43, 44 of the leaf and the ends of the casing which are formed by the layers 39, each layer being coated with resin.

The layer is produced in the form of a strip comprising continuous parallel strands of glass fibers retained by a loose weft thread. The strip formed in this way allows the strands to move apart uniformly within relatively wide limits, making it possible to adapt the width of the strip to the width of the surface to which it is to be fastened. The strip consisting of strands thus makes it possible to cover the upper and lower trapezoidal faces of the end of the leaf, whilst at the same time preserving the same number of fibers for surrounding the ring. The forces which the ring withstands are therefore transmitted as a whole over the entire width of the leaf.

After two strip layers 39 have been laid in the longitudinal direction, a layer 42 is arranged in the transverse direction.

In the exemplary embodiment of FIG. 6, the layer 42 in the transverse direction is formed by a strip of unidirectional fibers, the direction of the fibers being approximately at right angles to that of the layer 39 in the longitudinal direction, and it is impregnated with resin. The sequence of two layers 39 in the longitudinal direction and one layer 42 in the transverse direction is continued in this way, as FIG. 8 shows by the part in cross-section along the line VIII of FIG. 7. The pieces of fabric intended for forming the transverse layers are cut so that their adjacent edges do not form any extra thickness.

In the example illustrated, the composite terminal-piece/housing assembly formed in situ consists of ten fabric layers 39 in the longitudinal direction and of five fabric layers 42 in the transverse direction.

Thus, the terminal piece, on the upper face 40 and lower face 41 of the ends of the leaf, is formed by layers crossed at 90° and, on the lateral faces 43 and 44, is formed only by layers transverse relative to the direction of the fibers of the leaf.

According to another embodiment and where there are considerable shearing forces in the axial direction of the ring, the strip of unidirectional fibers forming the layers 42 in the transverse direction is replaced by a fabric of which the threads are crossed. In this case, the fibers are oriented at a given angle relative to the horizontal axis of symmetry of the leaf, in order to absorb the forces (FIG. 9).

The weave of this fabric can have alternative forms or different patterns designed to absorb the forces exerted in the longitudinal layers 39. A fabric with a plain or crossed-serge weave is preferably used.

The term "fabric" is used in its widest sense, namely:

for longitudinal covering of a strip of unidirectional fibers;

for the transverse covering of a strand or strip of unidirectional fibers composed of fabric with a plain or crossed-serge weave.

The layers with the strand of unidirectional fibers is formed by winding with contiguous turns.

The covering with the transverse layers 42 is limited, towards the end of the leaf, to the edges of the collars 38, and the width of the pieces of fabric of the transverse layers 42 decreases so as to form, with the longitudinal layers 39 of decreasing length, a progressive connection with the surfaces of the leaf.

The longitudinal layers 39 retain the ring 37 in the end of the leaf milled for this purpose and are retained transversely, at least during the production stage of the terminal piece, by the collars 38 which, during use, contribute, together with the adhesive bond, to absorbing the forces parallel to the axis of the ring 37.

It is clear that the number of layers and their sequence can vary without thereby departing from the scope of the invention.

The invention is not limited to the exemplary embodiments described, but also embraces the technical equivalents relating to a suspension leaf equipped with terminal pieces which have a trapezoidal inner volume matching the end parts of the leaf, preventing any longitudinal movement as a result of the trapezoidal shape of the opposite sides and the reversal of the slant of two adjacent sides.

We claim:

1. An elastic vehicle suspension leaf having, at its ends, terminal pieces equipped with means for connection to wheels, said leaf composed of a composite material with longitudinal fibers extending continuously from one end to the other, and having, at least at its ends, an evolute profile of approximately constant cross-section, the width of which decreases concomitantly with an increase in thickness, wherein each of the terminal pieces comprises, in combination, (a) a cylindrical ring seated in a bearing notch milled in the adjacent end of the leaf for connecting said leaf to a wheel, the ring axis being perpendicular to the bending plane of the leaf; (b) a U-shaped casing for maintaining the ring in the notch, said casing having lateral branches widened towards their free ends and applied on complementary shaped opposed sides of the leaf adjacent to a leaf end, and (c) a four-sided rigid housing defining a trapezoidal inner volume; the small bases of two opposite sides being adjacent to the large bases of two other sides, and the size of said inner volume being complementary of that of the leaf end, the lateral branches of the U-shaped casing being engaged by said housing so as to be self-blocked longitudinally on the leaf end together with the housing.

2. A leaf as claimed in claim 1, wherein said housing comprises:

a U-shaped framework having a bottom and two lateral sides in the form of a trapezium, of which the small bases of the lateral sides are adjacent to the large base of the bottom; and a cover in the form of a trapezium, the said cover being capable of engaging between the lateral sides of the framework.

3. A leaf as claimed in claim 2, whereina the edge of one free end of a lateral branch of the casing has a rim capable of butting against the free end of the framework and/or of the cover, the bottom of the casing's U gripping the connecting ring, at least one of the branches of the casing being arranged against the leaf between the bottom of the housing and/or the cover.

4. A leaf as claimed in claim 3, wherein the edge of the second free end of the casing has a rim capable of butting against the free end of the cover or of the framework.

5. A leaf as claimed in claim 3, wherein the second free end of the casing is pulled and turned down against the edge of the cover or of the framework in order to form a rim.

6. A leaf as claimed in claim 2, wherein the connection ring is fixed at least partially to the bottom of the U-shaped casing.

7. A leaf as claimed in claim 2, wherein one of the lateral branches of the casing is fixed to the bottom of the framework or the cover.

8. A leaf as claimed in claim 2, wherein the cover is U-shaped and has a bottom and two lateral sides in the form of a trapezium, the said cover being capable of engaging between the lateral sides of the framework.

9. A leaf as claimed in claim 2, wherein the longitudinal edges of the sides of the framework and those of the sides of the cover are fixed to one another by means of welding.

10. A leaf as claimed in claim 2, wherein the longitudinal edges of the sides of the framework and those of the sides of the cover are fixed to one another by means of crimping.

11. A leaf as claimed in claim 2, wherein the bottom and the lateral sides of the framework and of the cover and the lateral branches of the casing have injection orifices.

12. A leaf as claimed in clam 1, wherein the terminal pieces forming housings are produced in situ, at the ends of the leaf, from layers consisting of a strip of unidirectional fibers covering the ends of the upper face and lower face of the leaf, partially surrounding the connection ring and arranged in the longitudinal direction of the leaf, alternately with fabric layers arranged in the transverse direction of the leaf and covering the longitudinal layer or layers and the lateral faces of the leaf, the layers being impregnated with synthetic resin.

13. A leaf as claimed in claim 12, wherein the fabric layers arranged in the transverse direction of the leaf are formed from a strip of unidirectional fibers.

14. A leaf as claimed in claim 13, wherein the fabric layers arranged in the transverse direction of the leaf are formed from a plain-weave fabric.

15. A leaf as claimed in claim 13, wherein the layers in the transverse direction of the leaf are formed by the winding with contiguous turns of a strand of unidirectional fibers.

16. A leaf as claimed in claim 12, wherein the fabric layers arranged in the transverse direction of the leaf are formed from a fabric with a crossed-serge weave.

17. A leaf as claimed in claim 12, wherein the connection ring carries, at its ends, collars, between which the layers consisting of a strip of unidirectional fibers are retained.

18. A leaf as claimed in claim 12, wherein the terminal piece comprises ten layers consisting of a strip of unidirectional fibers arranged in a longitudinal direction and of five layers of fabric with a plain weave or a crossed-serge weave, in the transverse direction, one transverse fabric layer being separated from the next by two longitudinal strip layers.

* * * * *